United States Patent
Wang

(10) Patent No.: US 6,326,888 B1
(45) Date of Patent: *Dec. 4, 2001

(54) AUXILIARY SAFETY WARNING LIGHT SYSTEM FOR A VEHICLE

(76) Inventor: Ching-Yung Wang, No. 6-7, Chung-Ching Rd., Kung-Ming Li, Sha-Lu Chen, Taichung Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/492,035

(22) Filed: Jan. 27, 2000

Related U.S. Application Data

(63) Continuation-in-part of application No. 09/213,276, filed on Dec. 17, 1998.

(51) Int. Cl.[7] ................................... B60Q 1/22
(52) U.S. Cl. .............. 340/463; 340/464; 340/465; 340/471; 340/475; 340/479; 340/362; 340/487
(58) Field of Search .................. 340/463, 479, 340/466, 467, 464, 468, 471, 485, 441, 472, 475, 465; 362/485, 488, 800, 487

(56) References Cited

U.S. PATENT DOCUMENTS

| | | | |
|---|---|---|---|
| 4,556,862 | 12/1985 | Meinershagen | 362/503 |
| 4,791,401 | 12/1988 | Heidman, Jr. | 362/541 |
| 4,868,541 | 9/1989 | Sullivan et al. | 340/464 |
| 4,954,808 | 9/1990 | Duerkob | 340/478 |
| 5,186,533 | 2/1993 | Hori | 340/477 |
| 5,227,767 * | 7/1993 | Tanaka | 340/463 |
| 5,264,997 | 11/1993 | Hutchisson et al. | 340/479 |
| 5,663,707 | 9/1997 | Bartilucci | 362/226 |
| 5,666,103 * | 9/1997 | Davis, Jr. | 340/479 |
| 5,675,220 | 10/1997 | Dault et al. | 340/472 |
| 5,764,141 | 6/1998 | Chang | 340/465 |
| 5,818,332 * | 10/1998 | Chen | 340/441 |
| 5,825,281 * | 10/1998 | McCreary | 340/425.5 |
| 5,905,434 * | 5/1999 | Steffan et al. | 340/464 |
| 5,966,073 * | 10/1999 | Walton | 340/479 |
| 6,020,814 * | 2/2000 | Robert | 340/467 |
| 6,188,317 * | 2/2001 | Wang | 340/465 |

FOREIGN PATENT DOCUMENTS

| | | |
|---|---|---|
| 1468323 | 3/1977 | (GB). |
| WO89/11984 | 12/1989 | (WO). |
| WO94/12368 | 6/1994 | (WO). |
| WO96/23674 | 8/1996 | (WO). |
| WO97/35744 | 10/1997 | (WO). |

* cited by examiner

*Primary Examiner*—Edward Lefkowitz
*Assistant Examiner*—Davetta W. Goins
(74) *Attorney, Agent, or Firm*—Rosenberg, Klein & Lee

(57) ABSTRACT

An auxiliary safety warning light system for a vehicle includes a light assembly having a first side lighting portion, a mediate lighting portion and a second side lighting portion and a control unit connecting the light assembly to the light-control system of the vehicle or independently to the steering panel of the vehicle. The light assembly can light and/or blink in different conditions so as to facilitate the identification of the state and intentions of the vehicle and decrease the likelihood of accidents to secure the driver's safety.

13 Claims, 8 Drawing Sheets

AUXILIARY SAFETY WARNING LIGHT SYSTEM FOR A VEHICLE

CROSS-REFERENCES

The present invention is a continuation-in-part application of Applicant's U.S. application Ser. No. 09/213,276, filed on Dec. 17, 1998, now pending.

BACKGROUND OF THE INVENTION

1. Field of the Invention

The present invention relates to an auxiliary safety warning light for a vehicle such as a car, a motorcycle, a bicycle and the like.

2. Description of Related Art

Generally, when a car turns right or left, the red turn indicator lights will blink continuously. However, when the car is driven on a snowy or rainy day, in heavy fog, or in any conditions with bad visibility, the red hazard lights on the car will also blink continuously to warn cars. When a driver is in a hazardous situation, the left and the right indicator lights will not function since both indicator lights are already blinking. The driver has no choice but to turn off the hazard indicator to use the turn indicator light. Therefore, when a hazardous situation and a lane-changing situation occur simultaneously, the difficulty arises that precludes being able to indicate both situations to a following car which can easily result in the driver in the following car misjudging the lead driver's intentions so that a car accident occurs.

In the case where the lead car has two indicator lights situated very close together, a driver in a following car far away from the lead car may not be able to distinguish which light is blinking.

In the case where the lead car is equipped with turn indicator lights having small arrow marks, the light in the form of the arrow mark will not be distinguished when the driver of a following car is near-sighted or the following car is far from the lead car.

If the lead car is equipped with a PI-LI light, which is a series of lights continually emitting one after one, the light emitting from the PI-LI light will cause optical fatigue to a driver in a following car.

A prior art signaling light is provided with five arrays of lights cooperatively indicating the turning direction of a car. However, this signaling light can only function when the brake of the car is in operation. The prior art signaling light is not convenient in use because the brake and the light arrays need to be operated together.

Another prior art signal light is provide with three lighting portions with two side lighting portions blink together while the mediate lighting portion is turned off. This prior art signal light is not good enough either because the two side lighting portions need to blink simultaneously.

The present invention has arisen to solve the above-mentioned problems.

SUMMARY OF THE INVENTION

The primary objective of the present invention is to provide an auxiliary safety warning light for a vehicle, which includes a light-emitting assembly with a first side lighting portion, a mediate portion and a second side lighting portion and a control unit connected to the light circuit of a vehicle and the lamp unit. The mediate portion will continuously emit light to serve as a light bar between the first and the second side lighting portions while the first and/or the second side lighting portions can blink together.

Further benefits and advantages of the present invention will become apparent after a careful reading of the detailed description with appropriate reference to the accompanying drawings.

DETAILED DESCRIPTION OF THE PREFERRED EMBODIMENT

Figure 1:
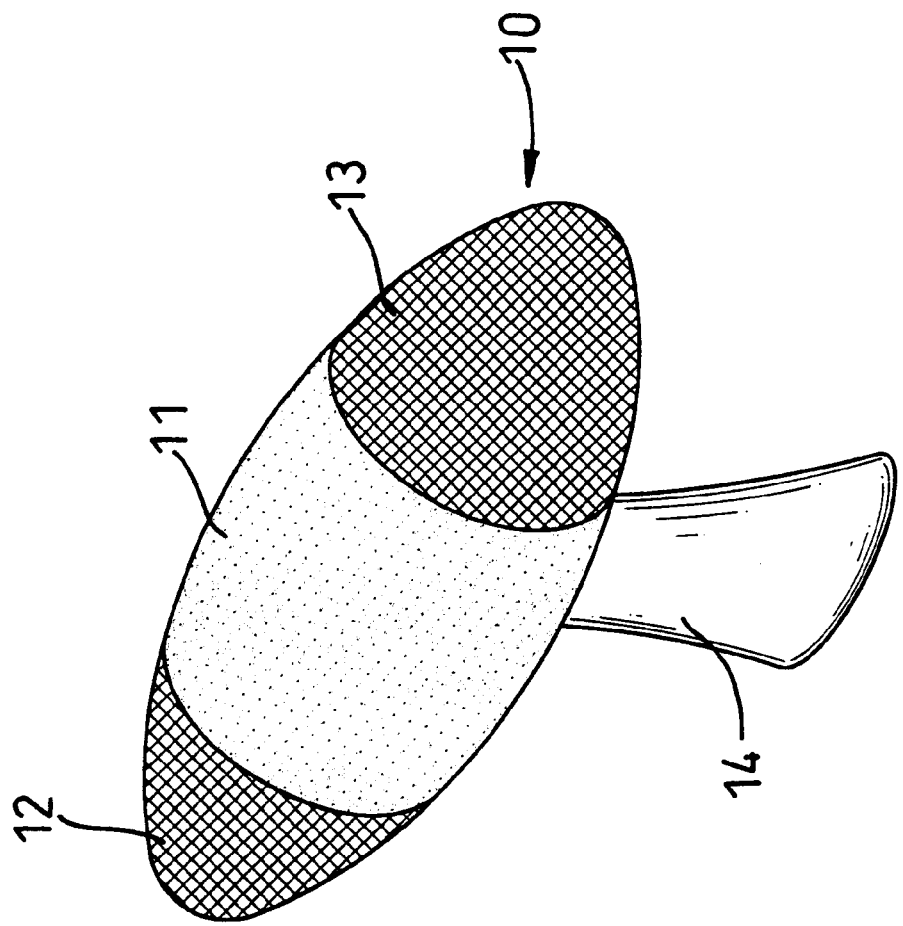
FIG. 1 is a perspective view of an auxiliary safety warning light system in accordance with the present invention.
Figure 2:
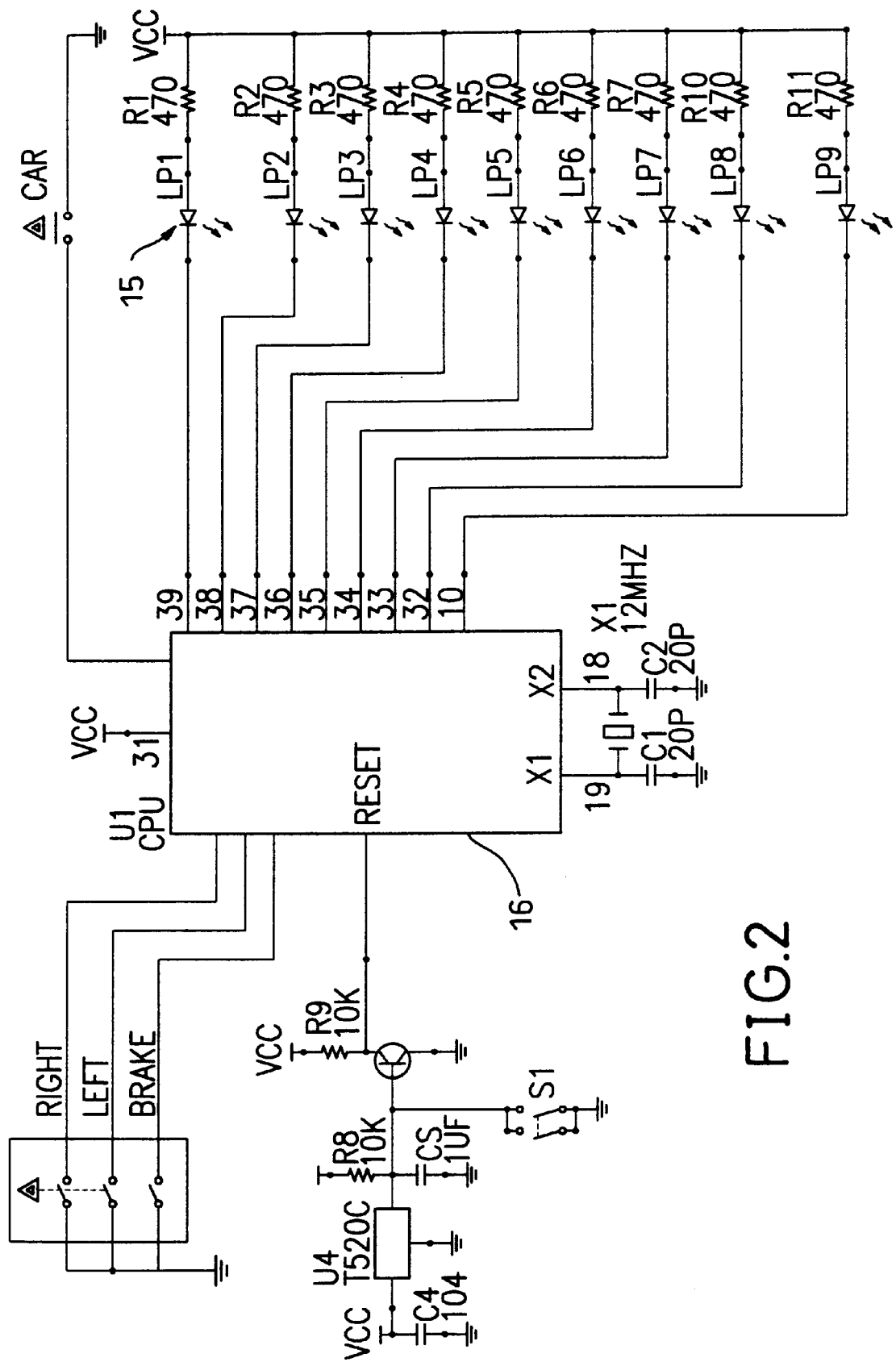
FIG. 2 is a circuit diagram of a controller for the auxiliary safety warning light system in FIG. 1.
Figure 8:
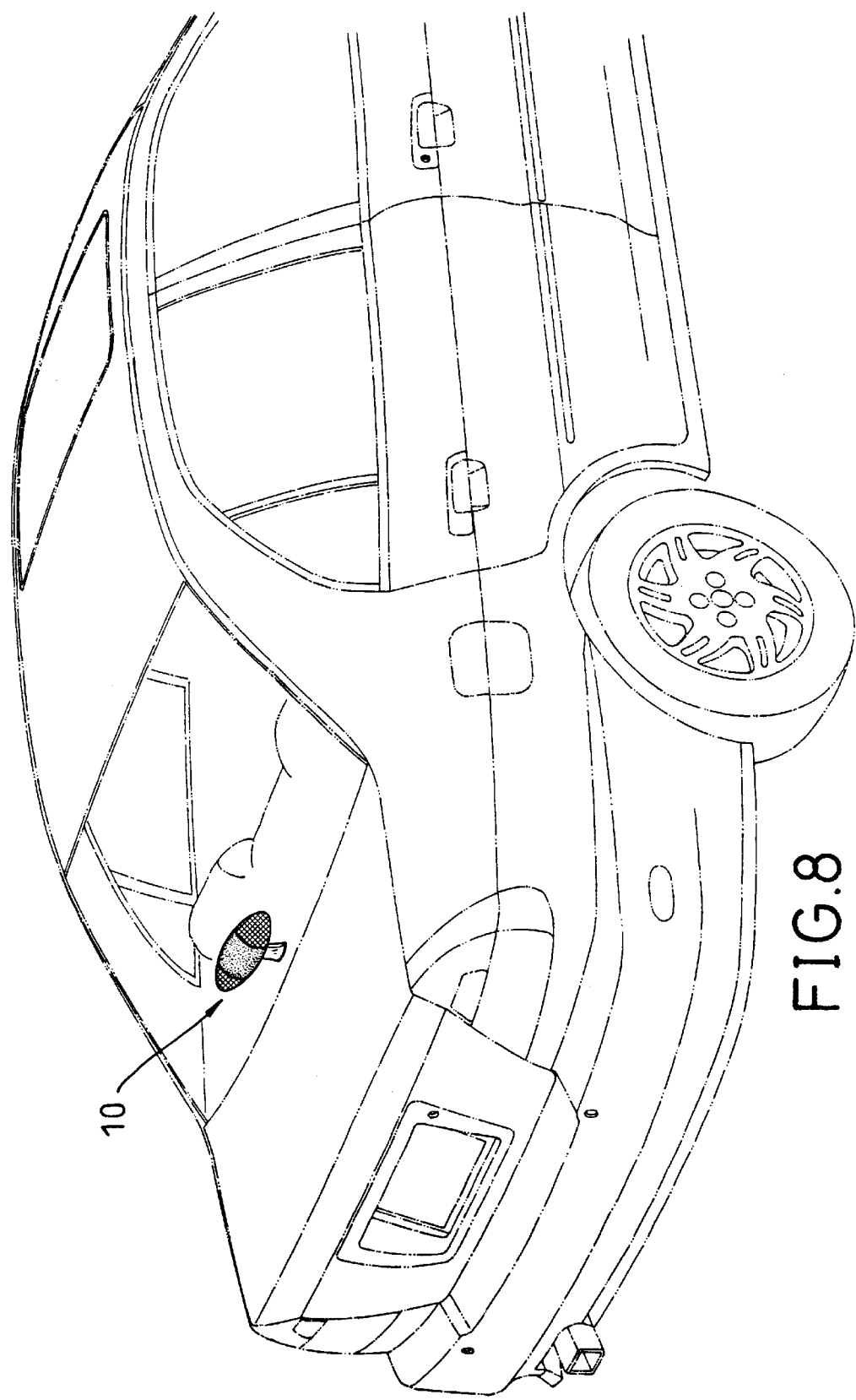
FIG. 8 is a perspective view of the lamp unit of the auxiliary safety warning light in FIG. 1 being used on a car.

With reference to FIGS. 1–2 and 8, an auxiliary safety warning light system in accordance with the present invention can be used on a car, a motorcycle, a bicycle, a motorized wheelchair and the like. The auxiliary safety warning light system comprises a light assembly (10) and a control unit (not shown) connecting the light assembly (10) to a light-control system of a vehicle so that the light assembly (10) in accordance with the present invention and the lights of the vehicle can be controlled simultaneously (detail depicted in FIG. 9). The light assembly (10) includes a mediate lighting portion (11) with at least one light, a first side lighting portion (12) located on a first side of the mediate lighting portion (11) and having at least one light, and a second side lighting portion (13) located on a second end of the mediate lighting portion (11) and having at least one light. Preferably, the lights in the first and second lighting portion (12, 13) are yellow, and the light in the mediate lighting portion (11) is red. Optionally, the three lighting portions (11, 12, 13) can be three lights of the same color. The light control unit of the auxiliary safety warning light system can be isolated from the light-control system of the car and be directly controlled by the driver by means of an additional, electrically connected control unit on the steering panel of the car.

Figure 6:
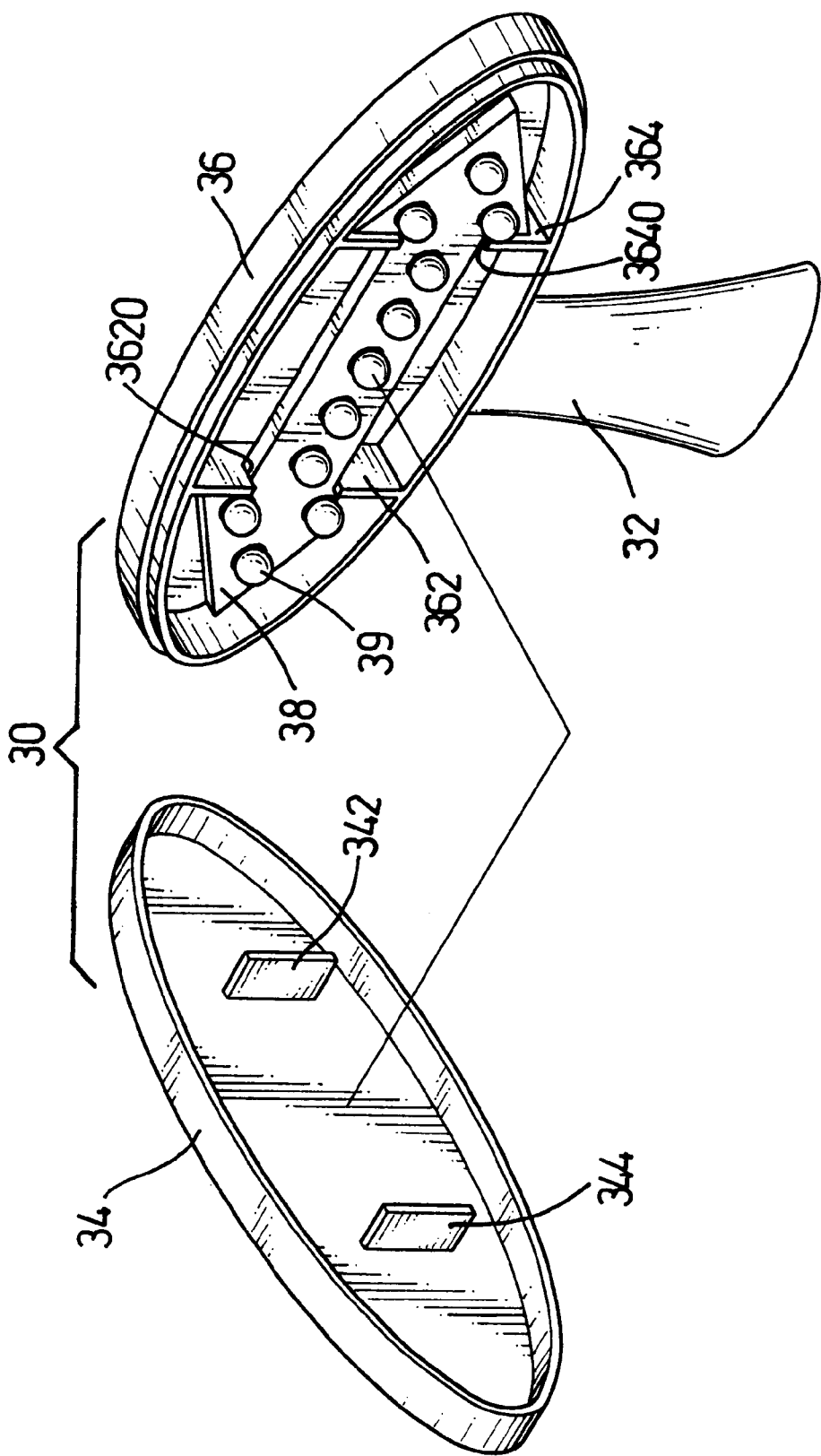
FIG. 6 is an exploded perspective view of another embodiment of the auxiliary safety warning light system in accordance with the present invention.

The control unit used in the present invention may be a central control unit (CPU) or an equivalent control loop thereof With reference to FIG. 6, another embodiment of the auxiliary safety warning light system (30) in accordance with the present invention comprises a supporting member (32), a housing mounted on the supporting member (32) and consisting of a first casing (34) and a second casing (36) and a base (38) received in the housing and having multiple light-emitting devices (39) mounted thereon. The first casing (34) has to two panels (342, 344) integrally extending therefrom, and the second casing (36) has two panels (362, 364) integrally extending therefrom. Each panel (362, 364) has a recess (3620, 3640) aligned with the panel (342, 344) so that when the first and the second casings are attached together, the base (38) passes through the recesses (3620, 3640) and the panels (342, 344, 362, 364) will separate the housing together with the base (38) into three portions with each portion of the base (38) having a group of the light-emitting devices (39). The light-emitting devices (39) can be any suitable light-emitting devices such as LEDs, lamps and back light devices, for example, LCD (liquid crystal display). Optionally, the casings (34, 36) are omitted, such that the base (38) together with the light-emitting devices (39) separated into three groups can serve as the light assembly (40) alone and functions also well.

Figure 7:
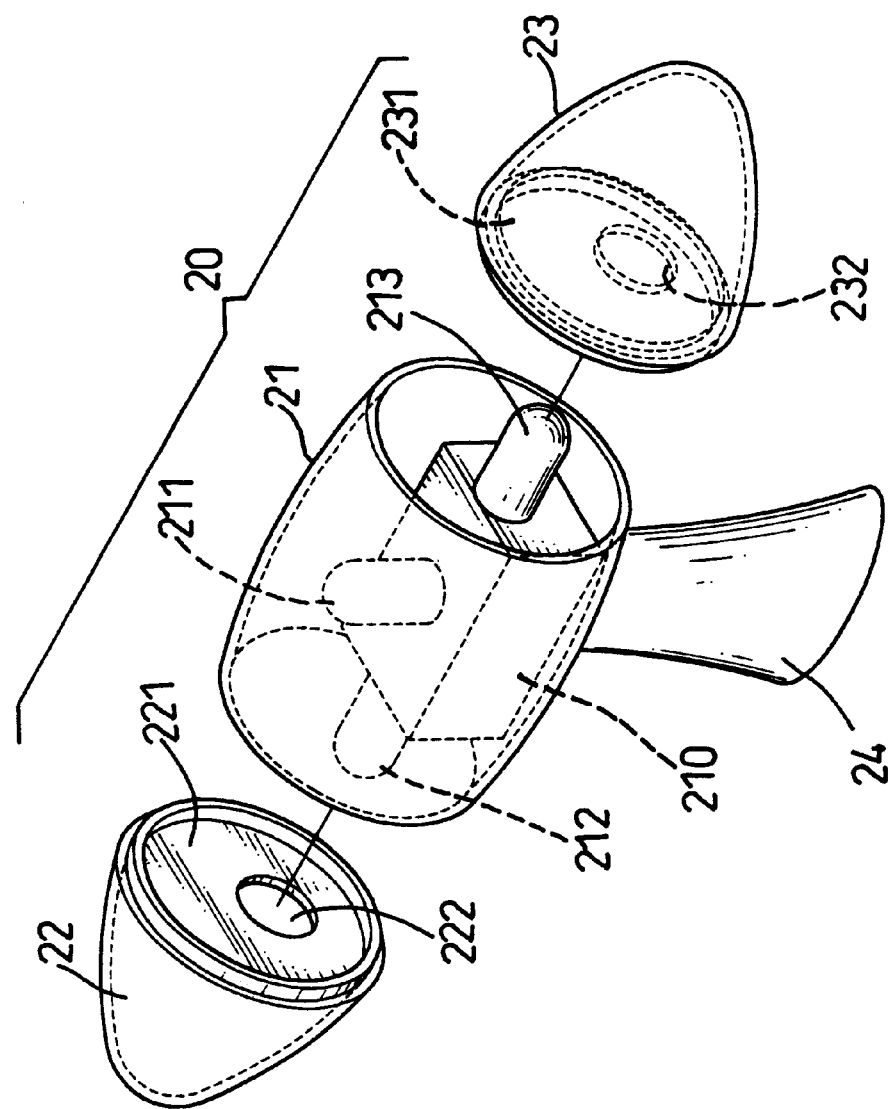
FIG. 7 is an exploded perspective view of another embodiment of the auxiliary safety warning light system in accordance with the present invention.

With reference to FIG. 7, another embodiment of the auxiliary safety warning light system (20) comprises a hollow housing including a first side lighting portion (22), a second side lighting portion (23), a mediate portion (21) connecting the first side lighting portion (22) to the second side lighting portion (23), a base (210) received in the mediate portion (21) of the housing and having three light emitting device (211, 212 and 213) mounted thereon and a supporting member (24) mounted on the base (23) and extending through the mediate portion (21). Two panels (231, 221) are provided on each end of the mediate portion (21) to respectively separate the mediate portion (21) from the first side lighting portion (22) and the second side lighting portion (23). Each panel (231, 221) has an opening (232, 222) to respectively allow the light emitting devices (213, 212) to pass through. Each light emitting device (211, 212, 213) is independently connected to a control unit. The light-emitting devices (211, 212 and 213) can be any suitable light-emitting device such as LEDs, lamps and back light devices, for example, LCD (liquid crystal display). In practice, with reference to FIGS. 3–5 and 9, the light assembly (10) can be used to produce various indicating and warning signals. If the car equipped with the light assembly (20) is in normal condition, the light system of the car can function together with the auxiliary safety warning light system in accordance with the present invention. If the car equipped with light assembly (20) is out of order, according to the logic flow chart in FIG. 9, the auxiliary safety warning light system will automatically start to replace the indicating and warning light system of the car.

Figure 3:
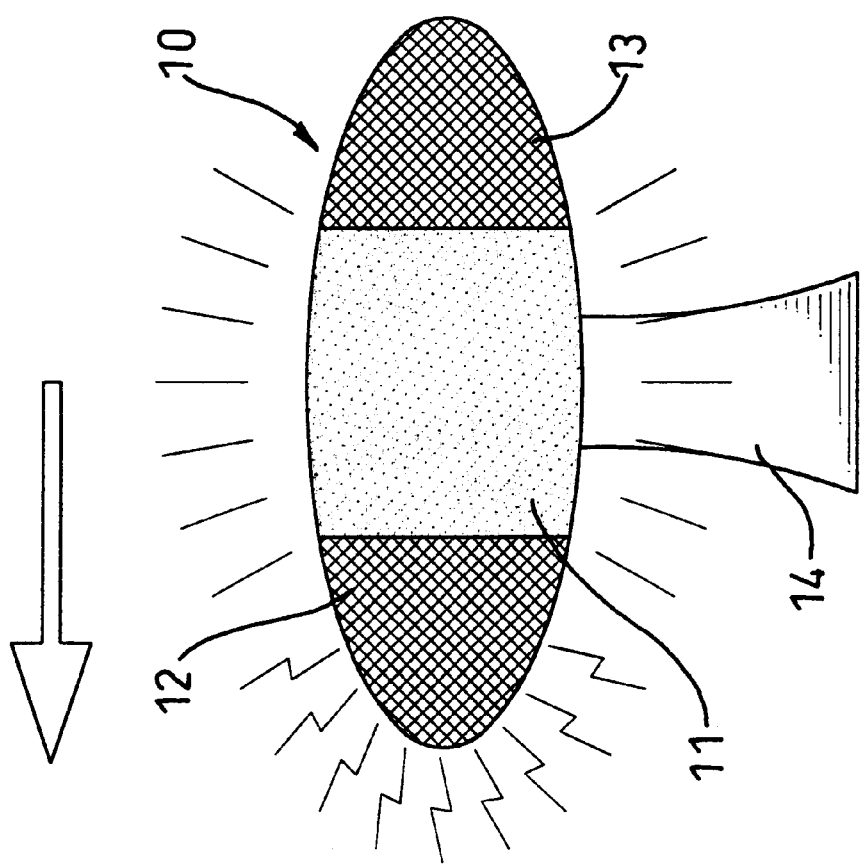
FIG. 3 is a schematic view of the lamp unit of the auxiliary safety warning light in FIG. 1 indicating a left turn.
Figure 9:
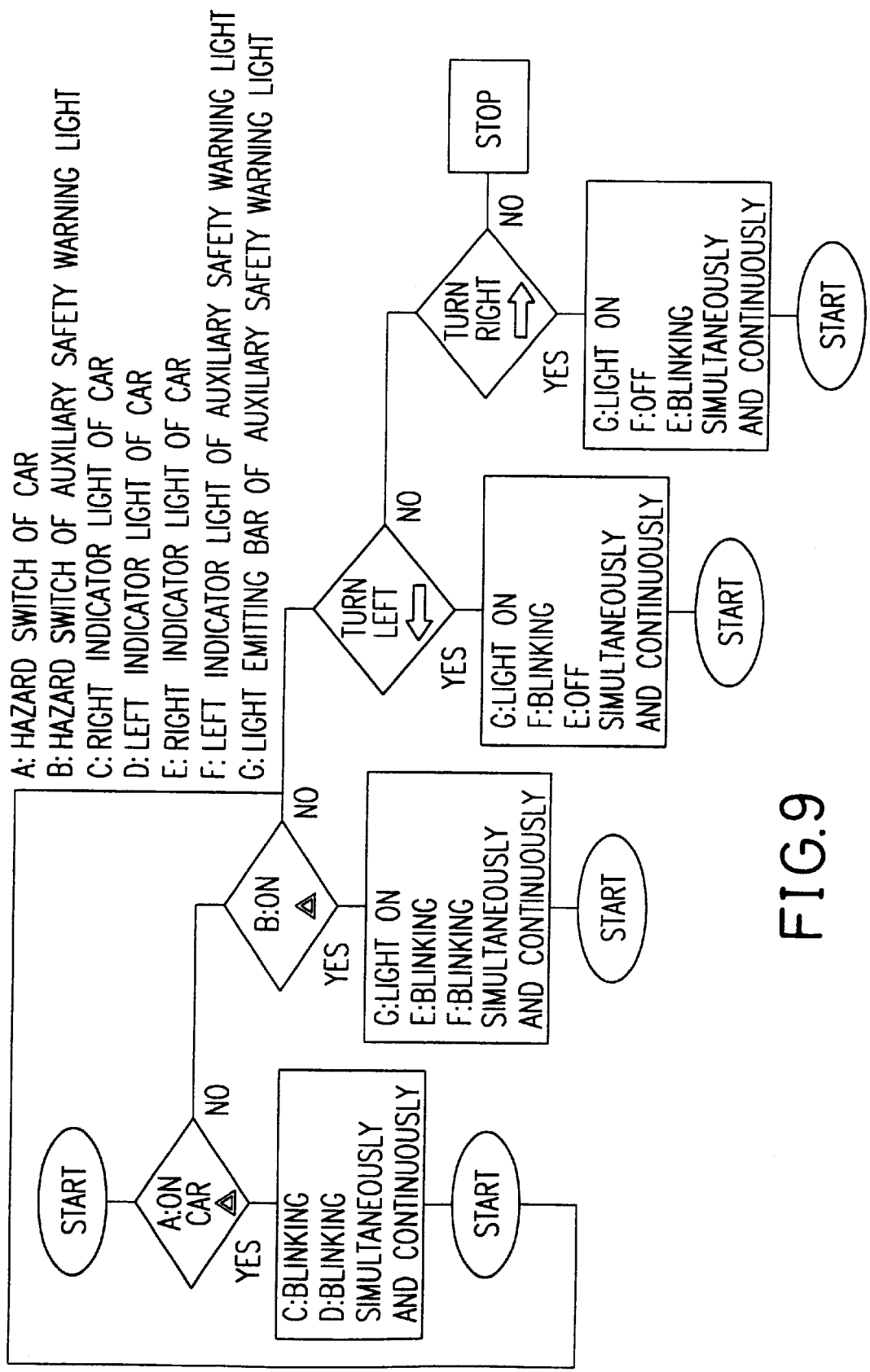
FIG. 9 is a logic flow chart of the light-emitting function of the auxiliary safety warning light system of FIG. 1.

With reference to FIGS. 3 and 9, when the vehicle is in either the normal or out of order conditions and about to turn left, each of the red lights of the mediate lighting portion (11) lights simultaneously and continuously serving as a light bar, and each of the yellow lights in the first side lighting portion (12) blinks simultaneously and continuously.

Figure 4:
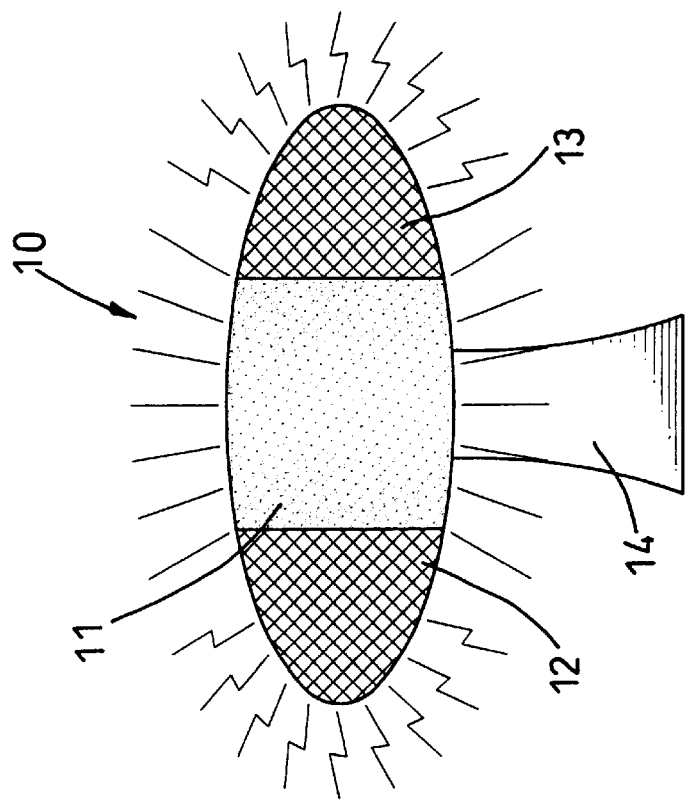
FIG. 4 is a schematic view of the lamp unit of the auxiliary safety warning light in FIG. 1 indicating a right turn.

With reference to FIGS. 4 and 9, when the vehicle in either the normal or out of order conditions is about to turn right, each of the red lights of the mediate lighting portion (11) lights simultaneously and continuously serving as a light bar, and each of the yellow lights of the second side lightening portion (13) blinks simultaneously and continuously.

In such a manner, the red lights of the mediate lightening portion (11) which light simultaneously and continuously can be regarded as a red light bar. Then, when the yellow lights of the first side lightening portion (12) blink, it is easy to distinguish that the vehicle is about to turn left. Alternatively, when the yellow lights of the second side lightening portion (13) blink, it is easy to distinguish that the vehicle is about to turn right.

Figure 5:
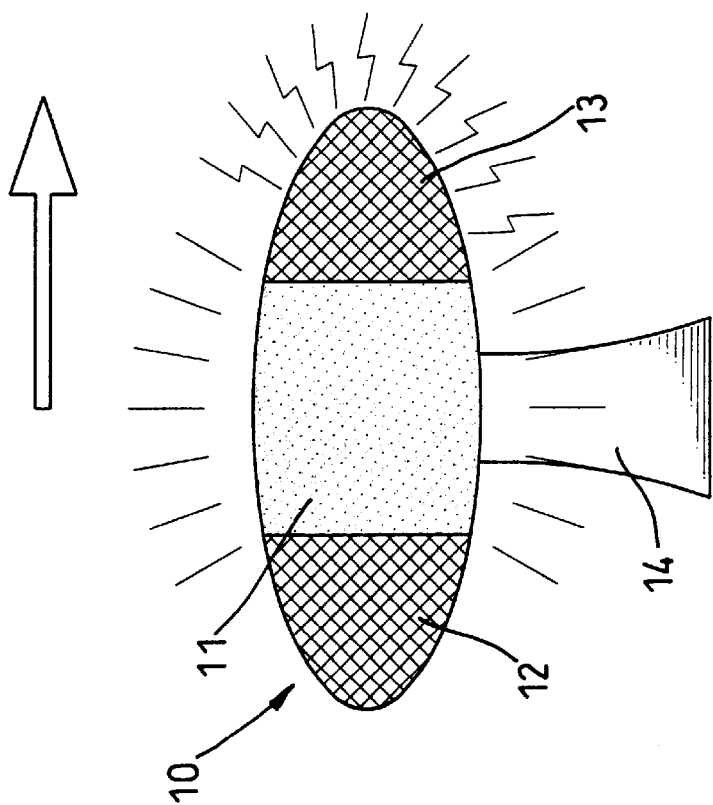
FIG. 5 is a schematic view of the lamp unit of the auxiliary safety warning light in FIG. 1 in a special condition.

With reference to FIG. 5, when the vehicle is placed in a special condition, each light of the lamp unit (10) blinks simultaneously and continuously. In the case of a special condition, the mediate lighting portion (11) will continually and simultaneously light forming a light bar with the first lighting portion (12) and the second lighting portion (13), each on one end of the light bar and serving as an indicator light, simultaneously and continuously blinking. The light bar in mediate portion plus the blinking light on the two sides thereof will obviously be identified as a hazard light (double blinking lights). If the mediate lighting portion does not light and the distance between the two side lights is very short, it will be easy for a following car to interpret them as a whole light resulting misjudging them as an indication of direction, and it will be difficult to distinguish left direction or right direction. Therefore, it is very dangerous.

In such a manner, when the yellow lights of the first side and second side lightening portions (12, 13) blink simultaneously and continuously, it is easy to distinguish that the blinking double yellow lights are used to indicate a special condition.

Accordingly, the light assembly (10) of the auxiliary safety warning light can be adapted to produce an intermediate "light bar" to provide various warning signals so as to indicate the current position and condition of the vehicle, thereby facilitating the identification of the state and intentions of the vehicle, thereby decreasing the likelihood of accidents so as to secure the driver's safety.

Referring to FIGS. 1 and 8, a supporting member (14) is mounted under the light assembly (10) to elevate the light assembly (10) so as to put the light assembly (10) in a prominent position.

It should be clear to those skilled in the art that further embodiments may be made without departing from the scope of the present invention.

What is claimed is:

1. An auxiliary safety warning light system for a vehicle comprising:

a light assembly having a mediate lighting portion, a first side lighting portion located at a first end of the mediate lighting portion and a second side lighting portion located at a second end of the mediate lighting portion and a light control unit so configured that each lighting portion is capable of lighting and/or blinking independently;

wherein the mediate lighting portion of the light assembly is a light-emitting bar distinguishably separated from the first and the second side lighting portion;

whereby the light control unit is so configured that the mediate lighting portion of the auxiliary safety warning light system can light continuously when a vehicle equipped with the auxiliary safety warning light system is together with the first side lighting portion blinking when the vehicle turns left and the second side lighting portion blinking when the vehicle turns right; and wherein the first/second side lighting portion and the mediate lighting portion are operated synchronously.

2. The auxiliary safety warning light system as claimed in claim 1, wherein the light control unit is electrically connected to the light-control system of a car.

3. The auxiliary safety warning light system as claim in claim 1, wherein the light control unit is independently, electrically connected to the steering panel of a car.

4. The auxiliary safety warning light system for a vehicle as claimed in claim 1, wherein the lighting portions (11, 12, 13) of the light assembly (10) comprises a housing consisting of a first casing (34) and a second casing (36) attached to the first casing (34), the first casing (34) having two panels (342, 344) integrally extending therefrom and the second casing (36) having two panels (362, 364) integrally extending therefrom with each panel (362, 364) having a recess (3620, 3640) defined therein and aligned with the panel (342, 344) in the first casing (34), a base (36) received in the housing and having two portions respectively passing through the recesses (3620, 3640), such that the base (36) is separated into three portions, and multiple light-emitting devices (39) mounted on each portion of the base (36) and separated by the panels (342, 344, 362, 364) into three groups.

5. The auxiliary safety warning light system for a vehicle as claimed in claim 1, wherein the lighting portions (11, 12, 13) of the light assembly (10) comprise a hollow housing with a first side lighting portion (22), a second side lighting portion (23) and a mediate portion (21) situated between the first and second side lighting portions (22, 23), a base (210) mounted in the mediate portion (21), two panels (221, 231) respectively mounted on the first and the second side lighting portions (22, 23) to respectively separate the mediate portion (21) from the first and the second side lighting portions (22, 23) with each panel (221, 231) having an opening (222, 232) defined therein, and three light-emitting devices (212, 213, 211) respectively mounted on the base (210) with the light-emitting device (212) extending through the opening (222) into the first side lighting portion (22) and the light-emitting device (213) extending through the opening (232) into the second side lighting portion (23).

6. The auxiliary safety warning light system for a vehicle as claimed in claim 1, wherein the control unit is a central processing unit (CPU).

7. The auxiliary safety warning light system for a vehicle as claimed in claim 1, wherein the control unit is an control loop capable of independently and simultaneously controlling each one of the lighting portions (11, 12, 13).

8. The auxiliary safety warning light system as claimed in claim 1, wherein the mediate lighting portion (11), the first side lighting portion (12) and the second side lighting portion (13) are LCD (liquid crystal display).

9. The auxiliary safety warning light system as claimed in claim 1, wherein the mediate lighting portion (11), the first side lighting portion (12) and the second side lighting portion (13) are arranged on a base (38) and arranged into three groups so as to serve as the light assembly alone and function well also.

10. The auxiliary safety warning light system as claimed in claim 1, wherein the mediate lighting portion (11), the first side lighting portion (12) and the second side lighting portion (13) are of the same color.

11. The auxiliary safety warning light system as claimed in claim 1, wherein the mediate lighting portion (11), the first side lighting portion (12) and the second side lighting portion (13) are LED (light-emitting display).

12. The auxiliary safety warning light system as claimed in claim 1, wherein the mediate lighting portion (11), the first side lighting portion (12) and the second side lighting portion (13) are lamps.

13. The auxiliary safety warning light system as claimed in claim 1, wherein the mediate lighting portion (11), the first side lighting portion (12) and the second side lighting portion (13) are BL (back light).

* * * * *